United States Patent Office 3,367,960
Patented Feb. 6, 1968

3,367,960
PROCESS FOR REACTING 2,3-DICHLOROHEXA-FLUORO - 3 - CYCLOHEXENE - 1 - ONE WITH ALCOHOLS AND RESULTING PRODUCTS
Richard F. Sweeney, Randolph Township, Morris County, and Louis G. Anello, Basking Ridge, N.J., assignors to Allied Chemical Corporation, New York, N.Y., a corporation of New York
No Drawing. Filed Apr. 30, 1965, Ser. No. 452,383
5 Claims. (Cl. 260—483)

ABSTRACT OF THE DISCLOSURE

Process for preparing a mixture of 2-chloro-3-hydroxyhexafluoro-2-cyclohexene-1-one and an alkyl or hydroxyalkyl 1,1,2,2,3,3-hexafluoro-4-oxo-5-chlorohexanoate by heating a mixture of 2,3-dichlorohexafluoro-2-cyclohexene-1-one and an aliphatic alcohol.

---

This invention relates to a process for reacting 2,3-dichlorohexafluoro-2-cyclohexene-1-one with lower aliphatic alcohols and to the novel reaction products thus obtained.

According to the process of our invention, 2,3-dichlorohexafluoro-2-cyclohexene-1-one is reacted with an aliphatic alcohol, whereupon there is obtained a mixture of tautomeric 2-chloro-3-hydroxy-2-cyclohexene-1-one, together with substantial yields of a cleaved ester addition product of the tautomeric hydroxy compound and additional alcohol, namely an alkyl or hydroxyalkyl 1,1,2,2,3,3-hexafluoro-4-oxo-5-chloro hexanoate as shown in the equation below:

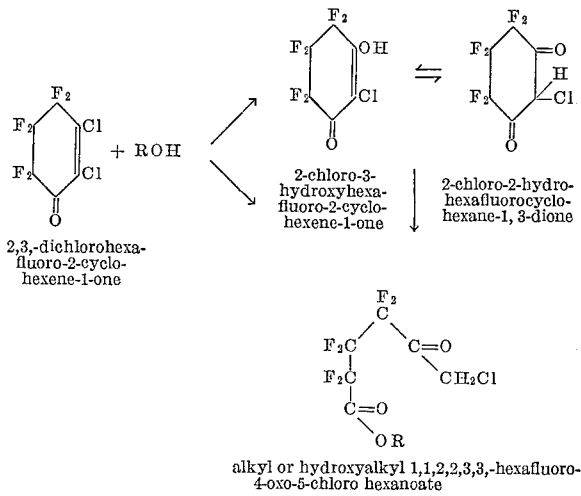

Unlike the reaction of the 5 carbon ring, the reaction with alcohol of the six carbon ring compound fails to proceed when water is substituted for an alcohol. Furthermore, in the above reaction with an alcohol, an intermediate alkoxy product, if formed, is so unstable that it is converted immediately to the hydroxy compound, thus producing a reaction mass containing no ether product.

In the above reaction, the tautomeric hydroxy compound and the cleaved ester product are both obtained in substantial yields, regardless of whether equimolecular proportions of reactants are used, or whether molar excesses of alcohol are provided.

The new tautomeric hydroxy compound of our invention is a solid at normal atmospheric temperatures; the cleaved ester are a liquid. Both are solvents when liquid, for homopolymers of trifluoromonochloroethylene and copolymers thereof with other monomers such as vinylidene fluoride and tetrafluoroethylene, wherein the trifluoromonochloroethylene constitutes at least a major portion of the polymer. We have found that excellent adhesives for joining films of such trifluoromonochloroethylene polymers and copolymers can be prepared by dissolving a small amount, for example, between 1 part and 10 parts of polymer per 100 parts of any one of our new compounds as solvent, and placing the adhesive thus produced between the surfaces of the films to be sealed and heating the films in contact with the polymer solution at temperatures between about 350° F. and 400° F. under pressures between about 20 p.s.i.g. and 40 p.s.i.g. for a period of at least 3 seconds. Under such conditions, excellent adhesion of the films is obtained, whereas with no adhesive, such films cannot be sealed at these temperatures and must be heated to temperatures in excess of about 425° C. to produce even a moderate degree of adhesion.

The 2,3-dichlorohexafluoro - 2 - cyclohexene-1-one used as starting material in our process can be prepared by reacting the corresponding 1,2-dichloroperfluorocyclic alkene with sulfur trioxide in the presence of a catalyst such as antimony pentachloride as described in copending U.S. application Ser. No. 373,058 of Richard F. Sweeney, Louis G. Anello, Melvin M. Schlechter and Benjamin Veldhuis, filed June 5, 1964.

In carrying out the preparation of the new compounds of our invention, the liquid 2,3-dichlorohexafluoro-2-cyclo-hexene-1-one (B.P. 135–140° C.) is mixed with amounts of alcohol from less than stoichiometric to a slight excess, quantities between about 0.25 mole and about 3 moles of alcohol per mole of ketone being suitable. The resulting mixture is preferably agitated, at least until solution is complete. The reactants can be mixed at normal atmospheric temperatures or below, if desired. The reaction will initiate at normal room temperature (ca. 20–25° C.) and is exothermic. The temperature of the mixture is preferably maintained at the reflux temperature of the starting alcohol, i.e., between about 80° C. and about 200° C. After completion of the reaction, usually in a period between about 1 hour and about 48 hours, excess alcohol is removed as by distillation. The resulting products are readily separated as by distillation.

The alcohols used in these reactions can be absolute, or they may contain water. However, if aqueous alcohols are used, it may be desirable to add an azeotroping solvent such as benzene to the reaction mixture prior to distillation to aid in the removal of water from the mixture. Suitable alcohols include methyl alcohol, ethyl alcohol, n-propyl alcohol, isopropyl alcohol, butanol, isobutanol, the pentanols, the hexanols, the heptanols, ethylene glycol, diethylene glycol, glycerol and the like.

The following specific examples further illustrate our invention. Parts are by weight except as otherwise noted.

Example 1

In a 500 ml., three-necked flask fitted with stirrer, condenser, and dropping funnel, were placed 120 grams (0.44 mole) of 2,3 - dichlorohexafluoro-2-cyclohexene-1-one. Then 220 grams (4.80 moles) of 95% ethanol were rapidly added with stirring. There was an immediate temperature rise to 55° C. The mixture was refluxed overnight; then 100 ml. of benzene were added. The mixture was then distilled, removing benzene, water and excess alcohol. Then a recovery was effected of 60 grams (0.23 mole) of a fraction of 2-chloro-3-hydroxyhexafluoro-2-cyclohexene-1-one, M.P. 60–61° C., B.P. 183° C. equivalent to a yield of 52% of theoretical, followed by recovery of 47 grams (0.13 mole) of ethyl 1,1,2,2,3,3-hexafluoro-4-oxo-5-chloro hexanoate, B.P. 210–212° C.

Infrared spectrographic analysis of the 2-chloro-3-hydroxyhexafluoro-2-cyclohexene-1-one showed a carbonyl absorption band at 5.75μ, a hydroxyl band at 3.0μ, and a C=C band at 6.15μ, indicating keto-enol tautomerism shown as follows:

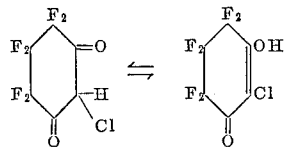

The N.M.R. absorption spectrum was compatible with this assigned structure.

*Analysis.*—Calcd. for $C_6F_6ClHO_2$: percent F, 45.88; percent Cl, 13.98; percent H, 040. Found: percent F, 45.0; percent Cl, 13.5; percent H, 0.45.

Infrared spectrographic analysis of the ethyl 1,1,2,2,3,3-hexafluoro-4-oxo-5-chloro hexanoate showed a carbonyl absorption at 5.6μ and an ethyl hydrogen absorption at 3.5μ, indicating the structure

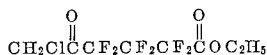

The N.M.R. absorption spectrum was compatible with this assigned structure.

*Analysis.*—Calcd. for $C_8F_6ClH_7O_3$: percent F, 38.00; percent Cl, 11.83; percent H, 2.33. Found: percent F, 37.3; percent Cl, 12.1; percent H, 2.12.

Example 2

Into a 250 ml., three-necked flask fitted with stirrer, condenser, thermometer, and dropping funnel, and connected to a Dry-Ice acetone trap were placed 100 grams (0.366 mole) 2,3-dichlorohexafluoro-2-cyclohexene-1-one.

Forty-six grams (1.0 mole) absolute ethanol were added dropwise to the reaction flask. The temperature rose from 25° C. to 50° C. After the addition was completed, the reaction contents were heated to reflux for 48 hours. There were recovered 117 grams of material from the reaction vessel and 3 grams of low boiler in the Dry-Ice acetone trap. The low boiler was identified by infrared to be ethyl chloride. The 17 grams of material were distilled on a small spinning band column. There was obtained a 4 gram forecut, B.P. 35-36° C., which was identified as diethyl ether, an intermediate cut (10 grams, 0.22 mole) of ethanol, B.P. 84° C., a main cut, (22 grams, 0.086 mole) of 2-chloro-3-hydroxyhexafluoro-2-cyclohexene-1-one, B.P. 92-94° C./20 mm. equivalent to a yield of 23.5%, and a final cut (39 grams, 0.13 mole) of ethyl 1,1,2,2,3,3 - hexafluoro-4-keto-5-chloro hexanoate, B.P. 102-104° C./20 mm., and a residue of 6 grams.

Infrared spectrographic analysis of the product showed it to be identical with that obtained in Example 1.

Example 3

Into apparatus similar to that described in Example 2 were placed 35 grams (0.13 mole) of 1,3-dichlorohexafluoro-2-cyclohexene-1-one. Twelve grams (0.38 mole) of absolute methanol were added over a 15-minute period. There was a temperature rise of 30° during the addition. The reaction mixture was further heated to reflux for 26 hours. The reaction temperature rose from 76 to 107° C. Three were recovered 36 grams of material from the reaction vessel and 11 grams of low boiling material in the Dry-Ice acetone trap. The low boiling material was identified by infrared to be a mixture of methyl chloride and dimethyl ether. The 36 grams of material in the reaction vessel were distilled on a small spinning band column. A main fraction was obtained, 16 grams, B.P. 62-64° C./3 mm., which was identified by infrared analysis as a mixture of 2-chloro-3-hydroxyhexafluoro-2-cyclohexene-1-one (0.03 mole, a yield of 23%) and methyl-1,1,2,2,3,3 - hexafluoro-4-oxo-5-chloro hexanoate, 0.028 mole, a yield of 21.2%. Vapor phase chromatographic analysis showed the presence of two compounds in about equal amounts, the retention time of the first compound being close to that found for the second compound.

The aforementioned mixture was placed in a 50 ml. flask as previously described. This material was heated to 115° C. and 3 grams (0.1 mole) methanol was slowly added over a 10-minute period. The reaction mixture was heated to reflux for 24 hours. The product was distilled on a small spinning band column. There was obtained a forecut of 1.4 grams, B.P. 44-48° C./1 mm., an intermediate cut of 5.8 grams, B.P. 48-62° C./1 mm., a cut of 1 gram of methyl 1,1,2,2,3,3-hexafluoro-4-oxo-5-chloro hexanoate, B.P. 62-66° C./1 mm. and a residue of 1 gram. Infrared spectrographic analysis of the methyl 1,1,2,2,3,3-hexafluoro-4-oxo-5-chloro hexanoate showed a carbonyl absorption at 5.6μ, and a methyl hydrogen absorption at 3.5μ, indicating the structure

*Analysis.*—Calcd. for $C_7F_6ClH_5O_3$: Percent C, 29.32; percent F, 39.79; percent Cl, 12,39; percent H, 1.74. Found: Percent C, 29.37; percent F, 39.65; percent Cl, 12.37; percent H, 1.72.

Example 4

A solution was made by dissolving one part of a copolymer of about 96% trifluoromonochloroethylene and 4% vinylidene fluoride in ten parts of ethyl 1,1,2,2,3,3-hexafluoro-4-oxo-5-chloro hexanoate. A portion of the solution was then spread in a thin film (ca. 0.1 to 0.2 mil in thickness) on a 2 mil thick film of the same type of a copolymer of about 96% trifluoromonochloroethylene and about 4% vinylidene fluoride. The coated film was then folded over onto a coated portion of the film, and the two layers thus formed were sealed on a bar type sealer by subjecting the film to a temperature of 375° F. and 30 p.s.i.g. for three seconds. For comparative purposes an untreated film of the same copolymer was folded and heat sealed under the same conditions. The sealed films were then tested for seal strength by cutting the film into strips having one inch square sealed portions with unsealed flaps at each end. One flap was secured in a clamp, the other flap was subjected to weights applied vertically to determine the weight necessary to rupture the seal or break the copolymer film. Results are shown in Table I below:

TABLE I.—SEAL STRENGTH OF COATED AND UNCOATED FILM

| Coating | Weight in grams required for break | Type rupture |
| --- | --- | --- |
| None | >10 | Seal opened. |
| 10% solution of copolymer in 2-chloro-3-hydroxyhexafluoro-2-cyclohexene-1-one. | 901 | Do. |
| 10% solution of copolymer in ethyl 1,1,2,2,3,3-hexafluoro-4-oxo-5-chloro hexanoate. | 2,278 | Film tore. |

It will be noted from Table I that the seal strengths of the laminates made from film which had been coated with the new compounds of our invention are tremendously greater than the seal made by heat and pressure alone exerted on the uncoated film. In the case of the film sealed with the aid of the ethyl 1,1,2,2,3,3-hexafluoro-4-oxo-5-chloro hexanoate, the strength of the seal is greater than that of the polymer film itself, so that on application of weights, the film itself tears before the seal gives way.

While the above describes the preferred embodiments of our invention, it will be understood that departures can be made therefrom within the scope of the specification and claims.

We claim:

1. The process for preparing a mixture of 2-chloro-3-hydroxyhexafluoro-2-cyclohexene-1-one and an alkyl or hydroxylalkyl 1,1,2,2,3,3-hexafluoro-4-oxo-5-chloro hexanoate which comprises heating a mixture of 2,3-dichlorohexafluoro-2-cyclohexene-1-one and an alkanol or hydroxyalkanol of 1 to 7 carbon atoms at temperatures between about 25° C. and about 200° C. for a period of at least about 1 hour.

2. The process according to claim 1, wherein the reaction product is fractionally distilled and the 2-chloro-3-hydroxy-2-cyclohexene-1-one and the alkyl or hydroxyalkyl 1,1,2,2,3,3-hexafluoro-4-oxo-5-chloro hexanoate are separately recovered.

3. 1,1,2,2,3,3 - hexafluoro - 4 - keto-5-chloro hexanoate esters of the formula

wherein R is a member selected from the group consisting of alkyl radicals of 1 to 7 carbon atoms and hydroxyalkyl radicals of 1 to 7 carbon atoms.

4. Ethyl 1,1,2,2,3,3 - hexafluoro - 4-keto-5-chloro hexanoates of the formula

5. Methyl 1,1,2,2,3,3 - hexafluoro - 4 - keto - 5 - chloro hexanoates of the formula

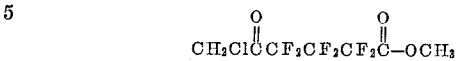

References Cited

UNITED STATES PATENTS 3,171,861   3/1965   Ahlbricht _____ 260—483

OTHER REFERENCES

Weil et al.: J. Org. Chem., vol. 28, pp. 2218, 2219 and 2222.

LORRAINE A. WEINBERGER, *Primary Examiner.*

V. GARNER, *Assistant Examiner.*

UNITED STATES PATENT OFFICE
CERTIFICATE OF CORRECTION

Patent No. 3,367,960                            February 6, 1968

Richard F. Sweeney et al.

It is hereby certified that error appears in the above numbered patent requiring correction and that the said Letters Patent should read as corrected below.

Column 3, line 14, "040" should read -- 0.40 --; line 55, "1,3-dichlorohexa" should read -- 2,3-dichlorohexa --; line 61, "Three" should read -- There --. Column 4, line 15, line 20, "%C 29.37" should read -- %C 29.47 --; line 73, "hydroxylalkyl" should read -- hydroxyalkyl --. Column 5, line 6, "hydroxyl" should read -- hydroxy --; line 18, "hexanoates" should read -- hexanoate --. Column 6, line 2, "hexanoates" should read -- hexanoate --.

Signed and sealed this 23rd day of September 1969.

(SEAL)
Attest:

EDWARD M. FLETCHER, JR.                    WILLIAM E. SCHUYLER, JR.
Attesting Officer                                 Commissioner of Patents